US011743170B2

(12) United States Patent
Estabrooks et al.

(10) Patent No.: US 11,743,170 B2
(45) Date of Patent: Aug. 29, 2023

(54) CALCULATING CUMULATIVE POWER CONSUMPTION ALONG A PATH IN A NETWORK

(71) Applicant: Ciena Corporation, Hanover, MD (US)

(72) Inventors: Kevin Estabrooks, Nepean (CA); Gregory Vanderydt, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 17/489,994

(22) Filed: Sep. 30, 2021

(65) Prior Publication Data

US 2023/0095746 A1 Mar. 30, 2023

(51) Int. Cl.
*H04L 45/12* (2022.01)
*H04L 45/122* (2022.01)
*H04L 43/10* (2022.01)
*H04L 12/12* (2006.01)

(52) U.S. Cl.
CPC ............ *H04L 45/123* (2013.01); *H04L 12/12* (2013.01); *H04L 43/10* (2013.01); *H04L 45/122* (2013.01)

(58) Field of Classification Search
CPC ....... H04L 45/123; H04L 12/12; H04L 43/10; H04L 45/122
See application file for complete search history.

(56) References Cited

U.S. PATENT DOCUMENTS

| | | | |
|---|---|---|---|
| 9,801,114 B2 * | 10/2017 | Logvinov | H04W 40/10 |
| 9,836,931 B1 | 12/2017 | Rivaud et al. | |
| 9,843,439 B2 | 12/2017 | Rivaud et al. | |
| 9,843,510 B2 * | 12/2017 | Wang | H04L 45/127 |
| 9,847,752 B2 | 12/2017 | Rivaud et al. | |
| 10,012,811 B2 | 7/2018 | Rivaud et al. | |
| 10,247,895 B2 | 4/2019 | Rivaud et al. | |
| 10,263,609 B2 | 4/2019 | Estabrooks et al. | |
| 10,355,799 B2 | 7/2019 | Abdullah et al. | |
| 10,764,659 B2 | 9/2020 | Vanderydt et al. | |
| 10,833,934 B2 * | 11/2020 | Karthikeyan | H04L 41/5025 |
| 10,855,623 B2 | 12/2020 | Estabrooks et al. | |
| 10,972,338 B2 | 4/2021 | Civil et al. | |
| 2003/0095761 A1 | 5/2003 | Nisbet et al. | |
| 2012/0275346 A1 * | 11/2012 | Wang | H04W 40/10 370/256 |
| 2019/0141056 A1 | 5/2019 | Estabrooks et al. | |

* cited by examiner

*Primary Examiner* — Chandrahas B Patel
(74) *Attorney, Agent, or Firm* — Baratta Law PLLC; Lawrence A. Baratta, Jr.

(57) ABSTRACT

Systems and methods for analyzing power or energy consumption parameters measured at each of a plurality of nodes or Network Elements (NEs) of a network are provided. A system, according to one implementation, includes a processing device and a memory device configured to store computer logic. The computer logic, for example, may be configured to enable the processing device to receive a power consumption value corresponding to an amount of energy expended at each of a plurality of NEs in a network. Also, the computer logic may be configured to enable the processing device to calculate a cumulative power consumption total from the power consumption values associated with the NEs arranged along a path in the network.

20 Claims, 2 Drawing Sheets

CALCULATING CUMULATIVE POWER CONSUMPTION ALONG A PATH IN A NETWORK

TECHNICAL FIELD

The present disclosure generally relates to networking systems and methods. More particularly, the present disclosure relates to calculating power consumption at each of a number of nodes in a network and determining a total power consumption value for one or more paths through the network.

BACKGROUND

Network growth is increasing exponentially for services such as video streaming and cloud-based services, such as data storage. As users transition away from local storage, this creates an increased demand for switching capacity and energy consumption in the core and in data centers. Studies have been done that link a network device's power consumption to the mode of operation, processing capacity, and even the size of the packets that a device processes.

As network operators build out their networks, power consumed by network devices is a key engineering consideration. Vendors are increasingly trying to reduce power consumption in their networks. Advanced network devices have the ability to measure real time power usage. Examples today range from test equipment (e.g., providing a readout on a chassis display showing power consumed) to routers and switches that provide readouts of power consumed.

Generally, communication networks may include a plurality of Network Elements (NEs), nodes, or other communication devices, where the devices may be provided by multiple vendors. Most vendors may include functionality to enable the calculation of power consumption at each of the individual NEs. However, this calculation is usually proprietary or closed to other NEs. That is, one vendor may employ a Network Management System (NMS) (or other higher-level controller, orchestrator, Software-Defined Networking (SDN) system, etc.) that can collect this power consumption data for some NEs, but it will not share this information outside the NMS.

Also, some of these higher-level systems may be inefficient in many situations or may provide more services than may be needed. These higher-level controllers may allow a network operator to log into each NE or node, view the local power consumption data (e.g., using a Command Line Interface (CLI), Graphical User Interface (GUI), or the like), and then collect this data as needed. However, this data is normally obtainable only on the local level for each individual local node. If the network operator wants to view power consumption along an entire network path, he or she must login to each node along the path.

Also, it should be noted that these orchestration tools only allow the network operator to collect power consumption information for the nodes and/or paths that the orchestrator is authorized to actively manage, which will typically not include nodes and/or paths related to other vendors. Therefore, network operators may not have the privileges to receive information from some equipment.

Thus, one of the shortcomings of conventional systems is that they do not offer an efficient way to monitor power consumption across multi-vendor networks, particularly in an end-to-end manner. Also, when new devices are added to a network, they may not be fully supported by the orchestration tools. Therefore, there is a need in the field of networking systems to enable a network operator to easily receive information about the total power consumption along entire paths within a network and not just the power consumption at each individual node.

BRIEF SUMMARY

The present disclosure focuses on systems, methods, and non-transitory computer-readable media configured to enable the processing of power consumption data measured at each of a plurality of Network Elements (NEs) or nodes (e.g., routers, switches, etc.) in a communications network. A system, according to one implementation, includes a processing device and a memory device. The method device is configured to store computer logic for enabling the processing device to receive a power consumption value corresponding to an amount of energy expended at each of a plurality of NEs in a network. Also, the computer logic is configured to enable the processing device to calculate a cumulative power consumption total from the power consumption values associated with the NEs arranged along a path in the network.

According to some implementations, the system may be incorporated in one of the plurality of NEs. In this respect, the computer logic may be further configured to enable the processing device to receive a packet from an adjacent NE, where the packet may include data and a running total of power consumption of at least the adjacent NE. Alternatively, the system may be incorporated in a centralized controller having access to the plurality of NEs. In this respect, the centralized controller may be configured to gather and record power consumption values from the plurality of NEs.

The processing device may utilize one of an Interior Gateway Protocol (IGP), an Exterior Gateway Protocol (EGP), a Link-State Routing Protocol (LSRP), an Internet Control Message Protocol (ICMP), ICMP according to RFC 792 or RFC 4443, the Simple Network Management Protocol (SNMP), Ping, TraceRoute, and modifications to one of IGP, EGP, LSRP, ICMP, SNMP, Ping, and TraceRoute. Also, the computer logic may further be configured to enable the processing device to calculate multiple cumulative power consumption totals respectively associated with multiple paths and then select a path from the multiple paths based on the cumulative power consumption total of each of the multiple paths.

In some implementations, the computer logic may be further configured to enable the processing device to determine a baseline power consumption metric at each of the plurality of NEs when no packets are being transmitted. Then, the processing device may be enabled to determine a total power consumption metric at each of the plurality of NEs when packets are being transmitted. From these parameters, the processing device can calculate an operating power consumption metric based on a difference between the total power consumption metric and the baseline power consumption metric. For example, the above-described cumulative power consumption total may be related to this operating power consumption metric.

The computer logic may further be configured to enable the processing device to use the power consumption value of each NE to calculate a power per bit metric for each NE. The power consumption value of each NE, for example, may depend on one or more of the mode of operation, processing capacity, and packet size.

In some implementations, the computer logic may be configured to enable the processing device to send a request from a source NE to the plurality of NEs along one or more paths to a destination NE with instructions for each NE to relay its own power consumption value in a direction of a forward service path to the destination NE. For example, these instructions may further include directives to calculate a running total of the power consumption values until the destination NE is reached. These instructions may also or alternatively include directives to calculate a power consumption value at the destination NE itself. These instructions may also or alternatively include directives to calculate a cumulative power consumption total for a reverse path from the destination NE to the source NE.

The above-described computer logic, for example, may also be configured to enable the processing device to determine whether or not power consumption values are received from one or more NEs in the network. In the case where the NEs are not configured to receive power consumption values, the processing device may be configured to determine a power consumption estimate based on a) Time-to-Live (TTL) metrics, b) number of hops, c) router alerts, and/or d) packet transport metrics.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

The present disclosure relates to systems and methods for analyzing power consumption at multiple Network Element (NEs) (e.g., nodes, switches, routers, etc.) in a network. As mentioned above, the conventional systems simple allow a network administrator or network operator to utilize tools to individually access power consumption of a limited number of NEs. However, the embodiments of the present disclosure are configured to improve upon the conventional systems by enabling the automatic calculation of cumulative power consumption totals along each of a number of paths from one node to another.

The systems and methods of the present disclosure may use a suitable type of Interior Gateway Protocol (IGP) for exchanging information between NEs. For example, according to various protocols, the NEs may be configured to exchange routing information (e.g., routing tables), operational parameters, or other information from one node to another. Some examples of IGPs include Open Shortest Path First (OSPF), Routing Information Protocol (RIP), Intermediate System to Intermediate System (IS-IS), and Enhanced Interior Gateway Routing Protocol (EIGRP). In some cases, the present embodiments may use a suitable type of Exterior Gateway Protocol (EGP) for exchanging routing information between autonomous systems, which may rely on IGPs to handle routes within each of the autonomous systems.

Some embodiments of the present disclosure may utilize link-state routing protocols (e.g., OSPF, IS-IS, etc.) for analyzing packet communication. The link-state routing protocol may be performed by every NE in the network, where the NEs may be configured to create a connectivity map that includes how the NEs are linked in the network. For example, connectivity information may be recorded in a routing table. Each NE may then independently calculate the next logical hop for transporting packets to a destination node. Thus, power consumption data may be transmitted, along with data packets, according to the link-state routing protocols. In some cases, link-state routing protocols and other suitable standards may be added, modified, or updated according to the embodiments of the present disclosure to allow the processing of power consumption data and the sharing of this power consumption information from one node to the next.

In various implementations, for example, the embodiments of the present disclosure may utilize the Internet Control Message Protocol (ICMP) in the Internet Protocol (IP) suite. In this way, it may be possible to exchange data related to power consumption throughout the network. With this power consumption data, network administrators may be able to more easily determine preferred routes that may be based on the least amount of extra power needed to conduct a service in the network. Typically, ICMP is used for exchanging data, but conventional systems are not set up to exchange data related to power consumption. Thus, the embodiments of the present disclosure are configured to enable the exchange of power consumption data throughout the network. This data can then be used to determine the actual amount of energy that would be needed to offer a service from one node to another, where this information could be used for determining a reasonable price for offering the service. Also, this information can be used for determining the power cost for transmission along different routes, whereby the path with the lowest power consumption cost may be selected as the best path.

Regardless of the type of protocols used, the present disclosure is configured to add a power consumption value to the information that is transmitted among NEs. In some embodiments, each NE may be configured to receive its own power consumption measurements and then add these measurements to power consumption measurements from other NEs to calculate a running total. Then, when packets reach a destination node, the destination node may be able to see the total power consumption information along each of a number of paths. According to alternative embodiments, a higher-level supervisory or management system (e.g., a Network Management System (NMS), Software-Defined Networking (SDN) controller, Operations, Administration, and Management (OAM) controller, etc.) may be used to receive power consumption values from each of the NEs and then calculate the cumulative power consumption amounts for each of the end-to-end paths through the network.

Thus, by automatically calculating the total power consumption along various paths, a network administrator does not need to actively manage individual nodes but can simply retrieve this power consumption information on demand. The network administrator would not have to log into each individual device to retrieve power usage information. The NEs in the network may be configured with the capabilities to perform the processes described in the present disclosure and can work together to monitor and share power consumption information to allow network administrators to determine preferable paths from any NE in the network to another. Therefore, the present disclosure provides embodiments that support request and response messages between NEs (or between a higher-level controller and each NE). In response to the request for power information, the network administrators may then collect the power consumption metrics from a simple utility (e.g., software) hosted on each device with IP connectivity.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Figure 1:
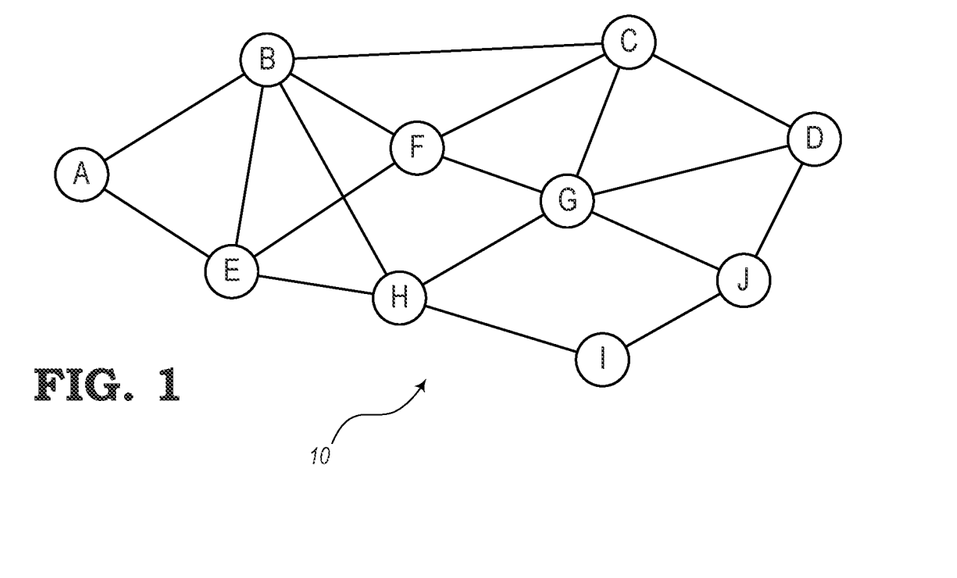
FIG. 1 is a diagram illustrating a mesh network, according to various embodiments.

FIG. 1 is a diagram illustrating an embodiment of a mesh network 10. In this example, the mesh network 10 includes a plurality of nodes (e.g., Node A through Node J) arranged with certain connectivity (e.g., links, fiber optic cables, etc.) between them. For the purpose of illustration, suppose that Node A represents a source node and Node D represents a destination node. In this case, there may be some routes through the network 10 that may be considered for transmission of packets from Node A to Node D, including, for example: ABCD, ABFGD, ABHGD, ABHIJD, AEFCD, AEFGD, AEHGD, AEHIJD, etc.

Suppose, for example, that monitoring equipment at each of the nodes in the network 10 are configured to locally measure a power consumption value at the local node. For example, the power consumption value may be a total power measurement when in operation or a measurement and calculation of an additional amount of power above a baseline power level (when idle). Also, suppose that it is determined that Nodes A, B, D, F, H, I, and J consumes 2 kW of power (e.g., total power or extra power needed for packet transmission). Suppose also that Nodes C, E, and G consume 7 kW of power. With this knowledge, the systems and methods of the present disclosure may be configured to automatically detect the power consumption from Node A to Node D along the multiple paths mentioned above. That is, it may be determined that the power consumption total (or cumulative power consumption) for each path would be: ABCD (13 kW), ABFGD (15 kW), ABHGD (15 kW), ABHIJD (12 kW), AEFCD (20 kW), AEFGD (20 kW), AEHGD (20 kW), AEHIJD (17 kW). Thus, in this example, it can be determined that path ABHIJD uses the least amount of power (e.g., 12 kW), even though this path is one of the longest paths of the above-listed choices.

Figure 2:
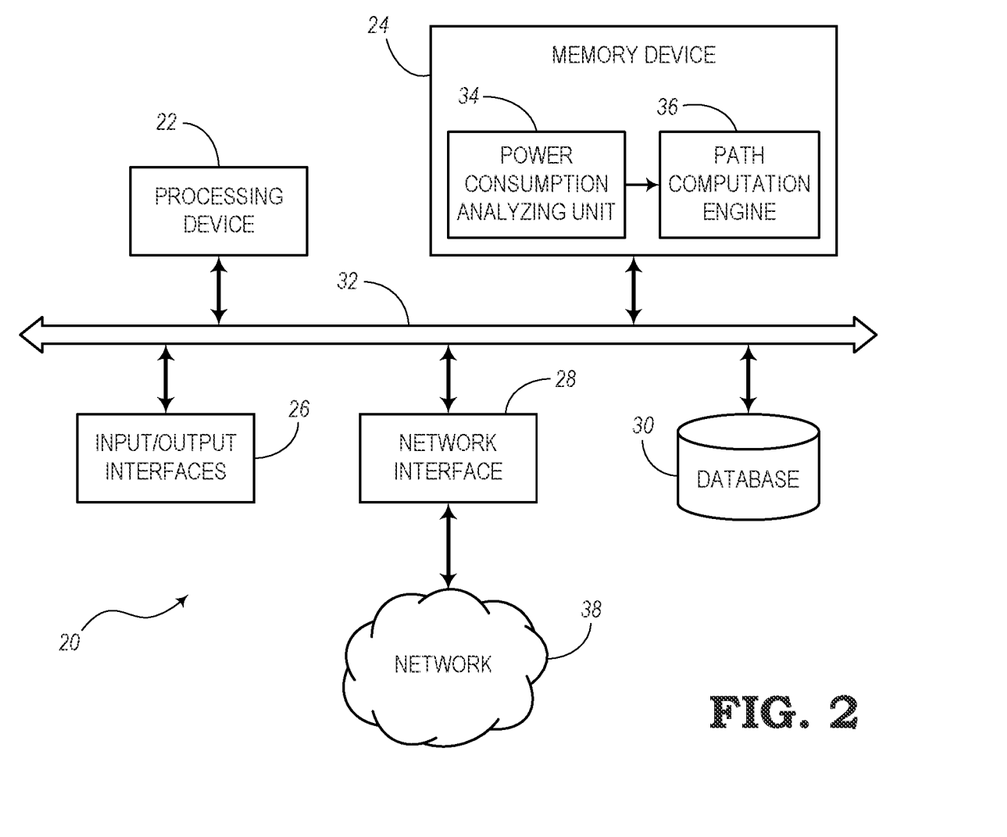
FIG. 2 is a block diagram illustrating a computing system for analyzing power consumption at one or more Network Elements (NEs) in a network, according to various embodiments of the present disclosure.

FIG. 2 is a block diagram illustrating an embodiment of a computing system 20 for analyzing power consumption. According to some embodiments, the computing system 20 may represent a higher-level controller (e.g., NMS device) that is configured to access the nodes of a network, request power consumption values from each of the nodes, receive responses from the nodes of the requested information, and then compute total power consumption along various paths. According to other embodiments, the computing system 20 may represent an analysis device that can be incorporated into any of the nodes or NEs. According to still other embodiments, the computing system 20 may include some functionality deployed in a higher-level controller and other functionality deployed in one or more of the nodes in the network (e.g., network 10).

In the illustrated embodiment, the computing system 20 may be a digital computing device that generally includes a processing device 22, a memory device 24, Input/Output (I/O) interfaces 26, a network interface 28, and a database 30. It should be appreciated that FIG. 2 depicts the computing system 20 in a simplified manner, where some embodiments may include additional components and suitably configured processing logic to support known or conventional operating features. The components (i.e., 22, 24, 26, 28, 30) may be communicatively coupled via a local interface 32. The local interface 32 may include, for example, one or more buses or other wired or wireless connections. The local interface 32 may also include controllers, buffers, caches, drivers, repeaters, receivers, among other elements, to enable communication. Further, the local interface 32 may include address, control, and/or data connections to enable appropriate communications among the components 22, 24, 26, 28, 30.

It should be appreciated that the processing device 22, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 22 may also include or utilize stored program instructions (e.g., stored in hardware, software, and/or firmware) for control of the computing system 20 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 24 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 24 may incorporate electronic, magnetic, optical, and/or other types of storage media. The memory device 24 may have a distributed architecture, where various components are situated remotely from one another, but can be accessed by the processing device 22.

The memory device 24 may include a data store, database (e.g., database 30), or the like, for storing data. In one example, the data store may be located internal to the computing system 20 and may include, for example, an internal hard drive connected to the local interface 32 in the computing system 20. Additionally, in another embodiment, the data store may be located external to the computing system 20 and may include, for example, an external hard drive connected to the Input/Output (I/O) interfaces 26 (e.g., SCSI or USB connection). In a further embodiment, the data store may be connected to the computing system 20 through a network and may include, for example, a network attached file server.

Software stored in the memory device 24 may include one or more programs, each of which may include an ordered listing of executable instructions for implementing logical functions. The software in the memory device 24 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 22), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 22 or other suitable circuitry or logic). For example, when executed, the instructions may cause or enable the processing device 22 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 22), or any suitable combination thereof. Software/firmware modules may reside in the memory device 24, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 26 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 26 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 28 may be used to enable the computing system 20 to communicate over a network, such as the network 38, mesh network 10, the Internet, a Wide Area Network (WAN), a Local Area Network (LAN), and the like. The network interface 28 may include, for example, an Ethernet card or adapter (e.g., 10BaseT, Fast Ethernet, Gigabit Ethernet, 10GbE) or a Wireless LAN (WLAN) card or adapter (e.g., 802.11a/b/g/n/ac). The network interface 28 may include address, control, and/or data connections to enable appropriate communications on the network 10, 38.

The computing system 20 may further include a power consumption analyzing unit 34 and a path computation engine 36. In some embodiments, the information derived from the power consumption analyzing unit 34 may be used as information to be used by the path computation engine 36 to compute preferred paths through the network 10, 38. In some embodiments, the power consumption analyzing unit 34 and path computation engine 36 may be configured as software, firmware, and/or middleware and stored in the memory device 24 or other non-transitory computer-readable medium. In other embodiments, the power consumption analyzing unit 34 and path computation engine 36 may be configured as hardware and established in the processing device 22. In still other embodiments, the power consumption analyzing unit 34 and path computation engine 36 may be configured as any suitable combination of hardware, software, firmware, and middleware. Each of the power consumption analyzing unit 34 and path computation engine 36 may be configured with logical computer instructions or computing logic that enables or causes the processing device 22 to perform various functions as described in the present disclosure.

According to one embodiment, the power consumption analyzing unit 34 may include logic or instructions that may be configured to enable the processing device 22 to receive a power consumption value corresponding to an amount of energy expended at each of a plurality of Network Elements (NEs) in a network. Also, the power consumption analyzing unit 34 may be configured to further enable the processing device 22 to calculate a cumulative power consumption total from the power consumption values associated with the NEs arranged along a path in the network.

The power consumption analyzing unit 34 may operate in conjunction with the path computation engine 36, whereby one or both may include logic for enabling the processing device 22 to calculate multiple cumulative power consumption totals respectively associated with multiple paths and then select a path from the multiple paths based on the cumulative power consumption total of each of the multiple paths. In some embodiments, the power consumption analyzing unit 34 may be configured to determine a baseline power consumption metric at each of the plurality of NEs when no packets are being transmitted and determine a total power consumption metric at each of the plurality of NEs when packets are being transmitted. Then, the power consumption analyzing unit 34 may be configured to calculate an operating power consumption metric based on a difference between the total power consumption metric and the baseline power consumption metric. For example, the cumulative power consumption total may be related to the operating power consumption metric.

The power consumption analyzing unit 34 may be configured to use the power consumption value of each NE to calculate a power per bit metric for each NE. The power consumption value of each NE may depend on one or more of the mode of operation, processing capacity, and packet size. Furthermore, the power consumption analyzing unit 34 may include the step of determining if power consumption values are not received from one or more NEs in the network. If so (i.e., for the NEs from which power consumption values are not received), the power consumption analyzing unit 34 may include determining a power consumption estimate based on one or more of Time-to-Live (TTL) metrics, hops, router alerts, and packet transport metrics.

Also, the power consumption analyzing unit 34 may be configured to enable the processing device 22 to send a request from a source NE to the plurality of NEs along one or more paths to a destination NE with instructions for each NE to relay its own power consumption value in a direction of a forward service path to the destination NE. The instructions may further include directives to calculate a running total of the power consumption values until the destination NE is reached. The instructions may also include directives to calculate a power consumption value at the destination NE itself. The instructions may further include directives to calculate a cumulative power consumption total for a reverse path from the destination NE to the source NE.

Figure 3:
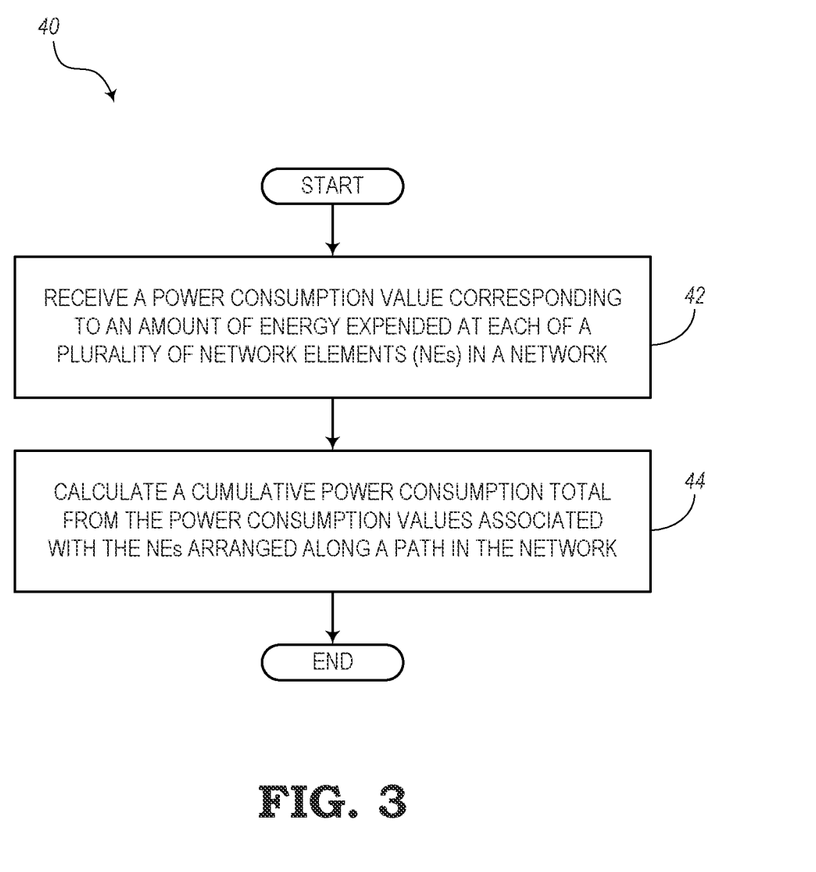
FIG. 3 is a flow diagram illustrating a process for calculating cumulative power consumption along a path in a network, according to various embodiments of the present disclosure.

FIG. 3 is a flow diagram illustrating an embodiment of a process 40 for calculating cumulative power consumption along a path in a network. In the illustrated embodiment, the process 40 includes the step of receiving a power consumption value corresponding to an amount of energy expended at each of a plurality of Network Elements (NEs) in a network, as indicated in block 42. Also, the process 40 includes the step of calculating a cumulative power consumption total from the power consumption values associated with the NEs arranged along a path in the network, as indicated in block 44.

According to some embodiments, the process 40 may be performed by one or more suitable processors (e.g., processing device 22), which may be incorporated in a central controller (e.g., NMS, OAM device, SDN device, etc.). In alternative embodiments, the process 40 may be incorporated in one or more of the NEs themselves. When embedded in multiple NEs, the NEs may communicate with each other via regular packet-based transmission, wherein control portions of the packets may include power consumption information. In some cases, each NE may add its own measured power consumption value to a running total and then pass the total along to the next NE in the path. The communication of power consumption metrics within the network may include any suitable protocols or standards (e.g., IGP, EGP, LSRP, ICMP, SNMP, and the like) and/or may utilize new or existing network tool (e.g., Ping, TraceRoute, and the like) or modifications of new or existing network-analyzing utilities or services.

Therefore, the embodiments of the present disclosure enable the discovery of cumulative power consumption of network devices along a network path and the power consumption of a remote end station. While power consumption may be reported by orchestration, controller, or management systems, conventional systems only report from devices that a management system is managing. In order to report power consumption along a path, a management system would need to log into each device along a path and poll for the power consumed. However, these conventional system do not provide utilities for enabling end-to-end service power consumption calculations. However, the embodiments of the present disclosure are configured to overcome these deficiencies of the conventional systems and utilize any of the nodes (e.g., including nodes provided by different vendors) in the network.

Key elements in bringing up a service today may include a) required bandwidth, b) resiliency, and c) latency. Engineers typically do not take into consideration the amount of power a particular end-to-end path may consume. This is likely due to the fact there are no simple utilities available to determine power consumption along the entire network path, as is described in the present disclosure.

When a service provider brings up an end-to-end service for a customer, that service typically spans multiple hops across multiple vendor devices. The power trace utility of the present disclosure is configured to give an engineer an efficient manner of selecting power efficient paths and identify inefficient power consumption devices in a network.

In various implementations, the present disclosure provides a local host utility that sends an ICMP "power" or "power consumption" request message to an end station (e.g., destination node). Each network device along the path to the end station is configured to update the request message with the device's own power consumption in a "forward power" field in the data portion of an ICMP message. The "forward power" field could be cumulative or a list.

The following is an example of a Request Power Message that may be forwarded through the network:

```
Internet Control Message Protocol
    Type: X (Power (ping) request)
    Code: X
    Checksum: 0xf7fc [correct]
    [Checksum Status: Good]
    Identifier (BE): 0 (0x0000)
    Identifier (LE): 0 (0x0000)
    Sequence number (BE): 3 (0x0003)
    Sequence number (LE): 768 (0x0300)
    [Response frame: 14]
    [Forward Power 100W]
```

An end station (e.g., destination node) echo reply message may be provided in response to an echo request message. This may return a) the received cumulative "forward power," b) a cumulative "reverse power," and c) an "end station power" (e.g., the power consumed by the end device itself replying to the request).

The following is an example of a Reply Power Message that may returned back through the network from the end station (e.g., destination node) back to the original station (e.g., source node):

```
Internet Control Message Protocol
    Type: X (Power (ping) reply)
    Code: X
```

-continued

```
Checksum: 0xfffc [correct]
[Checksum Status: Good]
Identifier (BE): 0 (0x0000)
Identifier (LE): 0 (0x0000)
Sequence number (BE): 3 (0x0003)
Sequence number (LE): 768 (0x0300)
[Request frame: 13]
[Forward Power: 1000 W]
[Reverse Power: 1062 W]
[End Power: 150W]
```

The power consumption tool or utility (e.g., power consumption analyzing unit 34) may be configured to report the cumulative power consumption information in the following format:

```
> ping ip destination 4.4.4.1
Sending 5 ICMP Power Echos to 4.4.4.1, timeout is 1 second
Type 'Ctrl+C' to abort
! seq_num = 1 Forward = 1025 W Reverse = 1016 W End = 120W
! seq_num = 2 Forward = 1020 W Reverse = 1019 W End = 120W
! seq_num = 3 Forward = 1036 W Reverse = 1017 W End = 120W
! seq_num = 4 Forward = 1016 W Reverse = 1017 W End = 120W
! seq_num = 5 Forward = 1026 W Reverse = 1019 W End = 120W
```

In the cases of IP query/response (as with ICMP in the above example), the power consumption analyzing unit 34 may be configured to leverage Time-to-Live (TTL) tracking and derive path power from a list in the optional payload section that reports a power per TTL and reports if TTL was decremented without a reading, thereby reporting that a node was skipped.

The following is an example of the use of TTL information:

```
! TTL = 64 Forward = 256 W
! TTL = 63 Forward = 100 W
! TTL = 62 Forward =   —
! TTL = 61 Forward = 270 W
! TTL = 60 Forward = 190 W
! TTL = 64 Reverse = 252 W
! TTL = 63 Reverse = 100 W
! TTL = 62 Reverse =   —
! TTL = 61 Reverse = 260 W
! TTL = 60 Reverse = 195 W
```

If using the ICMP method described with TTLs, the reply may contain a forward TTL indexed power list and a reverse (i.e., reply) TTL indexed power list, accounting for per direction power usage.

According to other systems and methods, other embodiments could be used to determine power consumption along a service path. For example, some other methods may include:

1. Query/response protocols over IP and Ethernet networks. Such protocols could include SNMP, Netconf/Yang, Representational State Transfer (REST) Application Programming Interface (API), or the like. Power consumption received by query response protocols could be collected and analyzed by a management system (e.g., computing system 20).

2. IGP/EGP distribution (e.g., IS-IS, OSPF, iBGP, eBGP, and the like). In a similar manner in which link metrics can be distributed across a network, power consumption data described in the present disclosure could be distributed as well.

3. PCE queries, new protocols, shim OAM header, shim data plane header, etc.

Another consideration is packet transport technologies such as Multi-Protocol Label Switching (MPLS) Virtual Private Networks (VPNs) that do not look at the transported customer frame. In this case, the computing system 20 may be configured to leverage router alerts, control words, and other mechanisms for highlighting a frame as a packet that should be inspected hop-by-hop. The devices that do not support the capabilities described in the present disclosure might parse the packet and forward, as the packet is not destined for the local MAC or IP address.

Optical components that do not necessarily process packets could be accounted for by populating power usage on a packet device. For example, a packet device port that feeds into an optical amplifier may have the amplifier power populated on the packet device. In some embodiments, this may include a manual operation or possibly an action through OAM where the amplifier could message a packet device and insert power metrics into the packet layer along the data path.

The power consumption utility (e.g., power consumption analyzing unit 34) will return the current actual power usage. This, however, can be expanded to include a forecast of power usage if the connection were created. This could be accomplished by configuring the utility to mirror the service to be created (e.g., packet length) and collecting power consumption for a specified duration. Automation could also be employed to steer the utility over multiple available paths and find the path with the least amount of power usage. Automated processes could also be used to analyze a network and recommend service path changes to create power efficiencies in a network.

The power consumption analyzing unit 34 and other related systems and methods of the present disclosure may include many benefits. For example, the present power consumption utility systems and methods may have the ability to track real time power consumption along a network path, whereby conventional methods would normally need to track real time power by connecting to devices individually through Command Line Interface (CLI) or API devices to retrieve the information. The benefit of the present embodiments is that each device will update requests and response messages and thus a cumulative power consumption total can be reported with a single command.

Another benefit is the ability of the present embodiments to track real time power consumption on a remote station. In this case, an engineer, network operator, or network administrator may be able to collect power consumption information without having to log into each of the devices. This gives the operators the ability to quickly monitor and audit device power consumption with ease.

In addition, another benefit may include the ability to identify devices that may not be configured correctly. For example, advanced network devices may be able to report power consumption to a user. This may be an important metric to network operators. If a particular group (or model) of devices are configured incorrectly (e.g., they do not go to sleep when not in use), they will likely consume more power than necessary. This will adversely affect an operator's bottom line. The present systems and methods may be configured to identify power issues across multiple vendor devices, which would be a benefit to operators.

A further benefit of the present embodiments is the ability to function across multiple domains. For example, the power consumption analyzing systems and methods may be configured to operate by utilizing the various methods described in the present disclosure and may not be restricted to a single area or IGP. As long as devices in the network path support power request and response messages, the power consumption utility may be able to function.

Yet another benefit of the present disclosure is the ability to find a path with the lowest power utilization. The power consumption analyzing systems and methods of the present disclosure may be configured to operate, using the above-mentioned methods, to find a path with the lowest power utilization for a service. Service providers could then price services to better reflect the true cost of running a service.

The present systems and methods may provide operators with the ability to efficiently extract power consumption information that can be used for network planning and maintenance. The systems and methods provide simplicity of identifying power inefficiencies in a network by identifying network paths or end devices that may be consuming an abnormally high amount of power. The systems and methods may use a singular information model inherent to a packet messaging/protocol rather than maintaining a Yang model or RA across multiple vendor devices.

In addition, efficiency gains may be provided in that a user, who has access to a single device in the network that hosts the power consumption utility, can request the power usage of any path or end device that has reachability (and supports power consumption messaging). This may provide increased value proposition for orchestration software that leverages the power consumption messaging.

Therefore, the systems and methods of the present disclosure may be configured to leverage packet-based technologies to determine the real time power consumption of a remote device. They may leverage packet-based technologies to determine the cumulative power consumption of a forward service path. Also, they may leverage packet-based technologies to determine the cumulative power consumption of a reverse service path.

As described herein, the systems and methods may be configured to calculate power in a number of different ways. Thus, reported power may be a variable issue, depending on the needs of a network operator. For example, a power variable that represents a "baseline" power level may be measured in a system, which may represent the power in the absence of any traffic. When a system increases power usage, it may trigger additional power for cooling, which may also be factored into the power calculations.

Also, according to some embodiments, the cost of power may be considered. If a system (e.g., node, NE, etc.) is in a facility where power and cooling are more expensive or cheaper, this may be used to determine the actual cost at each facility. Therefore, some paths may use more power but may be utilizing power where the cost per usage is lower. These variables may be considered in the determination of total power consumption, total cost of power consumption, path calculation based on the least total power or the least total cost, etc.

The systems and methods of the present disclosure may be configured to deal with nodes that do not support the ICMP functionality of the utility. ICMP may be used as an implementation of the broader scope of the present disclosure, which may be a packet-based mechanism to query power along a path of packet transport devices. The present disclosure may be configured to include implementations of distributing the power information to query/response protocols over IP and Ethernet networks, IGP/EGP distribution, PCE queries, new protocol, shim OAM header, shim data plane header, or the like. Each will have consideration for devices that do not support the functionality of the present disclosure. In the cases of IP query/response (e.g., ICMP), the systems and methods may leverage the TTL tracking strategies described herein and derive path power from a list in an optional payload section that reports a power per TTL and reports if TTL was decremented without a reading, thereby reporting that a node was skipped. Another consideration is that some packet transport technologies (e.g., MPLS VPNs) may not look at the transported customer frame. In this case, the present embodiments may leverage router alerts, control words, and/or other mechanisms for highlighting a frame as a packet that should be inspected hop-by-hop. Those devices that do not support the functions of the power consumption analyzing unit 34 may parse the packet and forward as the packet is not destined for the local MAC or IP address.

The systems and methods of the present disclosure may also be configured to deal with optical components (e.g., optical amplifiers, Wavelength Selective Switching (WSS) devices, etc.) that do not "see" packets at all. Optical components that do not see packets, for instance, could be accounted for by populating power usage on a packet device. For example, a packet device port that feeds into an amplifier may have amp power populated on the packet device. This method could be as simple as a manual operation or possibly through OAM where the amplifier could message a packet device and insert power metrics into the packet layer along the data path.

Regarding how power data is normalized (e.g., a packet going through a small, low-capacity, low power NE versus a packet going through a large, high-capacity, large power NE), the present disclosure may be configured to utilize a packet-based mechanism to query and/or distribute the power per bit consumption for the candidate application servers and network paths that a packet transported application can select. Fundamental to this is how to normalize the power consumption reported by packet devices and populated within this packet-based method. For example, the present disclosure may support both coarse methods and elaborate methods in this regard for reporting actual power per bit.

Also, the present disclosure may be configured to normalize the power "per direction" or "per path" in the meshed networks (e.g., mesh network 10). According to some implementations, normalizing power per direction or per path may depend on given functionalities as described in the present disclosure. If an ICMP-based implementation is used, the reply may include a forward TTL indexed power list and a reverse (reply) TTL indexed power list, accounting for per direction power usage.

In an embodiment, a server "S" based on this disclosure would receive a query from a client device (either a handheld device or desktop, etc.) to access the "best" server "B" for some service of interest (SOI) to the client. The server "S" would determine the "best" server "B" amongst a number of candidate servers offering the SOI based on the invention (implemented on "S") by determining the best path amongst plurality of paths between the client and candidate servers offering SOI. The server "S" then responding to the client with the determined "best" server "B".

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a processing device, and
   a memory device configured to store computer logic for enabling the processing device to
      receive a power consumption value corresponding to an amount of energy expended at each of a plurality of Network Elements (NEs) in a network,
      determine if power consumption values are not received from one or more NEs in the network, and for the NEs from which power consumption values are not received, determine a power consumption estimate based on Time-to-Live (TTL) metrics where the power consumption estimate is based on a power per TTL, and
      calculate a cumulative power consumption total from the power consumption values associated with the NEs arranged along a path in the network.

2. The system of claim 1, wherein the system is incorporated in one of the plurality of NEs, and wherein the computer logic is further configured to enable the processing device to receive a packet from an adjacent NE, the packet including data and a running total of power consumption of at least the adjacent NE.

3. The system of claim 1, wherein the system is incorporated in a centralized controller having access to the plurality of NEs, and wherein the centralized controller is configured to gather and record power consumption values from the plurality of NEs.

4. The system of claim 1, wherein the computer logic is further configured to enable the processing device to utilize one of an Interior Gateway Protocol (IGP), an Exterior Gateway Protocol (EGP), a Link-State Routing Protocol (LSRP), an Internet Control Message Protocol (ICMP), ICMP according to RFC 792 or RFC 4443, the Simple Network Management Protocol (SNMP), Ping, TraceRoute, and modifications to one of IGP, EGP, LSRP, ICMP, SNMP, Ping, and TraceRoute.

5. The system of claim 1, wherein the computer logic is further configured to enable the processing device to:
   calculate multiple cumulative power consumption totals respectively associated with multiple paths, and
   select a path from the multiple paths based on the cumulative power consumption total of each of the multiple paths.

6. The system of claim 1, wherein the computer logic is further configured to enable the processing device to:
   determine a baseline power consumption metric at each of the plurality of NEs when no packets are being transmitted;
   determine a total power consumption metric at each of the plurality of NEs when packets are being transmitted; and
   calculate an operating power consumption metric based on a difference between the total power consumption metric and the baseline power consumption metric.

7. The system of claim 6, wherein the cumulative power consumption total is related to the operating power consumption metric.

8. The system of claim 1, wherein the computer logic is further configured to enable the processing device to use the power consumption value of each NE to calculate a power per bit metric for each NE.

9. The system of claim 1, wherein the power consumption value of each NE depends on one or more of the mode of operation, processing capacity, and packet size.

10. The system of claim 1, wherein the computer logic is further configured to enable the processing device to send a request from a source NE to the plurality of NEs along one or more paths to a destination NE with instructions for each NE to relay its own power consumption value in a direction of a forward service path to the destination NE.

11. The system of claim 10, wherein the instructions further include directives to calculate a running total of the power consumption values until the destination NE is reached.

12. The system of claim 10, wherein the instructions further include directives to calculate a power consumption value at the destination NE itself.

13. The system of claim 10, wherein the instructions further include directives to calculate a cumulative power consumption total for a reverse path from the destination NE to the source NE.

14. A non-transitory computer-readable medium configured to store computer logic having instructions that, when executed, enable a processing device to:
   receive a power consumption value corresponding to an amount of energy expended at each of a plurality of Network Elements (NEs) in a network,
   determine if power consumption values are not received from one or more NEs in the network, and for the NEs from which power consumption values are not received, determine a power consumption estimate based on Time-to-Live (TTL) metrics where the power consumption estimate is based on a power per TTL, and
   calculate a cumulative power consumption total from the power consumption values associated with the NEs arranged along a path in the network.

15. The non-transitory computer-readable medium of claim 14, wherein the non-transitory computer-readable medium is incorporated in a centralized controller having access to the plurality of NEs, and wherein the centralized controller is configured to gather and record power consumption values from the plurality of NEs.

16. The non-transitory computer-readable medium of claim 14, wherein the non-transitory computer-readable medium is incorporated in one of the plurality of NEs, and wherein the instructions are further configured to enable the processing device to receive a packet from an adjacent NE, the packet including data and a running total of power consumption of at least the adjacent NE.

17. A method comprising the steps of:
   receiving a power consumption value corresponding to an amount of energy expended at a plurality of Network Elements (NEs) in a network,
   determine if power consumption values are not received from one or more NEs in the network, and for the NEs from which power consumption values are not received, determine a power consumption estimate based on Time-to-Live (TTL) metrics where the power consumption estimate is based on a power per TTL, and
   calculating a cumulative power consumption total from the power consumption values associated with the NEs arranged along a path in the network.

18. The method of claim 17, further comprising the steps of:
   receiving the power consumption value corresponding to the amount of energy expended at an NE of the plurality of Network Elements (NEs); and determining the NE is not configured correctly based on the power consumption value.

19. The method of claim 17, further comprising the steps of:
calculating multiple cumulative power consumption totals respectively associated with multiple paths, and
selecting a path from the multiple paths based on the cumulative power consumption total of each of the multiple paths.

20. The method of claim 17, further comprising the steps of:
determining a baseline power consumption metric at each of the plurality of NEs when no packets are being transmitted;
determining a total power consumption metric at each of the plurality of NEs when packets are being transmitted; and
calculating an operating power consumption metric based on a difference between the total power consumption metric and the baseline power consumption metric.

* * * * *